United States Patent
Mehl et al.

(10) Patent No.: US 7,849,023 B2
(45) Date of Patent: Dec. 7, 2010

(54) SELECTING ACCOMMODATIONS ON A TRAVEL CONVEYANCE

(75) Inventors: Thomas Walter Heinrich Mehl, Brooklyn, NY (US); Richard Joseph Lamprea Montero, Makati (PH); Michal Mudron, Liptovsky Mikulas (SK); William Christopher Stirlen, Sandy, UT (US)

(73) Assignee: Accenture Global Services Limited, Dublin (IE)

( * ) Notice: Subject to any disclaimer, the term of this patent is extended or adjusted under 35 U.S.C. 154(b) by 425 days.

(21) Appl. No.: 12/051,607

(22) Filed: Mar. 19, 2008

(65) Prior Publication Data

US 2009/0240679 A1  Sep. 24, 2009

(51) Int. Cl.
G06F 15/18 (2006.01)
G06F 17/30 (2006.01)

(52) U.S. Cl. ........................................... 706/8; 707/748
(58) Field of Classification Search ................ 706/8; 707/748

See application file for complete search history.

(56) References Cited

U.S. PATENT DOCUMENTS

| | | | | |
|---|---|---|---|---|
| 6,242,701 | B1 * | 6/2001 | Breed et al. | 177/144 |
| 6,555,766 | B2 * | 4/2003 | Breed et al. | 177/144 |
| 6,653,577 | B2 * | 11/2003 | Breed et al. | 177/144 |
| 6,784,379 | B2 * | 8/2004 | Breed et al. | 177/144 |
| 6,833,516 | B2 * | 12/2004 | Breed et al. | 177/144 |
| 7,363,319 | B2 * | 4/2008 | Cappellini | 1/1 |
| 7,663,502 | B2 * | 2/2010 | Breed | 340/825.72 |

OTHER PUBLICATIONS

European Search Report & Written Opinion for Application No. 09250760.7-1238, dated Jul. 15, 2009, 6 pages.
"Statement in Accordance with the notice from the European Patent Office dated Oct. 1, 2007 Concerning Business Methods—EPC/ Erklaerung Gemaess der Mitteilung des Europaeischen Patentants vom. Oct. 1, 2007 ueber Geschaeftsmethoden EPU / Declaration conforment au communiqué de l'office europ." Journal Officiel de l'Office Europeen des Brevets. Offical Journal of the European Patent Office. Amtsblatt des Europaeischen Patentants, OEB, Munchen, DE, Nov. 1, 2007, pp. 592-593.

* cited by examiner

*Primary Examiner*—James Trujillo
*Assistant Examiner*—Jorge A Casanova
(74) *Attorney, Agent, or Firm*—Fish & Richardson P.C.

(57) ABSTRACT

The subject matter of this specification can be embodied in, among other things, a process that includes receiving digital accommodation criteria for an accommodation assignment requested for a passenger and accessing accommodation properties that specify characteristics of accommodations offered on a travel conveyance. A first portion of the accommodation properties are base properties and a second portion of the accommodation properties are derivation properties derived from the base properties during execution of a software program configured to access the accommodation properties. The process also includes assigning weights to the accommodation properties based on a comparison between the accommodation properties and the received accommodation criteria. The process includes determining total weighting scores for each of one or more of the accommodations based on an aggregation of the assigned weights for the accommodation properties associated with the accommodation and outputting the requested accommodation assignment.

20 Claims, 8 Drawing Sheets

*202*

|  | Available Seats 212 ||| 
| --- | --- | --- | --- |
|  |  | Quiet Ambience 214 | Social Ambience 216 | Senior Citizen 218 |
| Requested 210 | Quiet Ambience 213 | 0 | 1000 | 600 |
|  | Social Ambience 220 | 1000 | 0 | 800 |
|  | Senior Citizen 222 | 600 | 800 | 0 |

*204*

|  | Available Seats 226 ||
| --- | --- | --- |
|  |  | Smoking | No Smoking |
| Requested 224 | Smoking | 0 | 4000 |
|  | No Smoking | 4000 | 0 |

Request: Social Ambience and Smoking
*228*

Result for seats with Social Ambience and No Smoking:
Sum of penalties: 0 + 4000 = 4000
*206*

Result for seats with Senior Citizen and Smoking:
Sum of penalties: 800 + 0 = 800
*208*

FIG. 2

SELECTING ACCOMMODATIONS ON A TRAVEL CONVEYANCE

TECHNICAL FIELD

This instant specification relates to selecting an accommodation on a travel conveyance such as a train or aircraft.

BACKGROUND

Certain online reservation systems are used to make travel reservations. For example, certain online reservation systems can receive a destination and date for travel from a user. The received destination and date of travel can be used as criteria to perform a search to determine whether a seat on an aircraft is available. The search may locate one or more seats that correspond to the received date and destination details.

SUMMARY

In general, this document describes selecting accommodations such as seats compartments on a travel carrier.

In a first general aspect, a computer-implemented process is described. The process includes receiving digital accommodation criteria for an accommodation assignment requested for a passenger and electronically accessing accommodation properties that specify characteristics of accommodations offered on a travel conveyance. A first portion of the accommodation properties are base properties and a second portion of the accommodation properties are derivation properties derived from the base properties during execution of a software program configured to access the accommodation properties. The process also includes assigning weights to the accommodation properties based on a comparison between the accommodation properties and the received accommodation criteria. The process includes determining total weighting scores for each of one or more of the accommodations based on an aggregation of the assigned weights for the accommodation properties associated with the accommodation and digitally outputting, for the passenger, the requested accommodation assignment comprising a selected accommodation identified based on the selected accommodation's total weighting score.

In a second general aspect, a computer-implemented process is described and includes aggregating individual accommodations offered on a travel conveyance into accommodation groups and assigning, to each accommodation group, a plurality of group properties that specify characteristics of some of the individual accommodations included in the accommodation group. The process includes digitally receiving accommodation criteria for an accommodation assignment requested for a passenger, identifying a particular accommodation group having group properties that correspond to at least a portion of the received criteria, and comparing the received criteria to properties of individual accommodations within the particular accommodation group. The process also includes outputting, based on the comparison, the requested accommodation assignment comprising an individual accommodation selected from the particular accommodation group.

In yet another general aspect, a system is described that includes a data store storing accommodation properties that specify characteristics of accommodations offered on a travel conveyance. A first portion of the accommodation properties are base properties and a second portion of the accommodation properties are derivation properties derived from the base properties during execution of a software program configured to access the accommodation properties.

The system also includes a weight assigning module to assign weights to the accommodations based on a comparison between the accommodation properties and accommodation criteria received as part of an accommodation assignment request for a passenger and includes a sorting module to order the accommodations based on the accommodations' assigned weights. The system includes an interface to output the requested accommodation assignment comprising a particular accommodation selected based on a position of the particular accommodation within the ordered accommodations The systems and techniques described here may provide one or more of the following advantages. First, a system can quickly locate an accommodation that corresponds to criteria by analyzing relevant properties for a first accommodation before analyzing properties for a next accommodation. If the first accommodation meets the criteria (e.g., has properties that exactly correspond to the criteria), the system can return the first accommodation without unnecessarily analyzing other accommodations. A system also can identify an accommodation that most closely matches criteria using fuzzy logic.

In another aspect, a system can group accommodations at different levels of abstraction to facilitate quickly locating an accommodation that corresponds to received criteria. In yet another aspect, a system can cache information about overwritten data associated with accommodations or accommodation groups so that less data needs to be stored and analyzed when locating an accommodation.

The details of one or more embodiments are set forth in the accompanying drawings and the description below. Other features and advantages will be apparent from the description and drawings, and from the claims.

DESCRIPTION OF DRAWINGS

FIG. 2 shows two penalty point calculation tables 202, 204 and an exemplary penalty point calculations 206, 208 for accommodations.

DETAILED DESCRIPTION

This document describes systems and techniques for identifying accommodations on a travel carrier that correspond to criteria provided, for example, by a prospective passenger. In some implementations, each accommodation has properties that are matched with passenger-specified criteria using fuzzy logic. For example, a reservation system can assign penalty points to an accommodation if one or more of the accommodation's properties do not correspond to the passenger-specified criteria. The reservation system can sort available accommodations based on an amount of penalty points assigned to each accommodation and return an accommodation with the least amount of penalty points.

In some implementations, the data structures or software objects representing accommodations a travel carrier have extensible properties. For example, a user may be able to add, delete, or modify properties to a seating accommodation object during execution of the reservation system without having to recompile software code.

For simplicity of explanation, a software object or other data structure representing a physical object will be referred to herein using the name of the entity that the data structure represents. For example, an accommodation software object having variables that represent properties will be referred to as an accommodation having properties.

Figure 1:
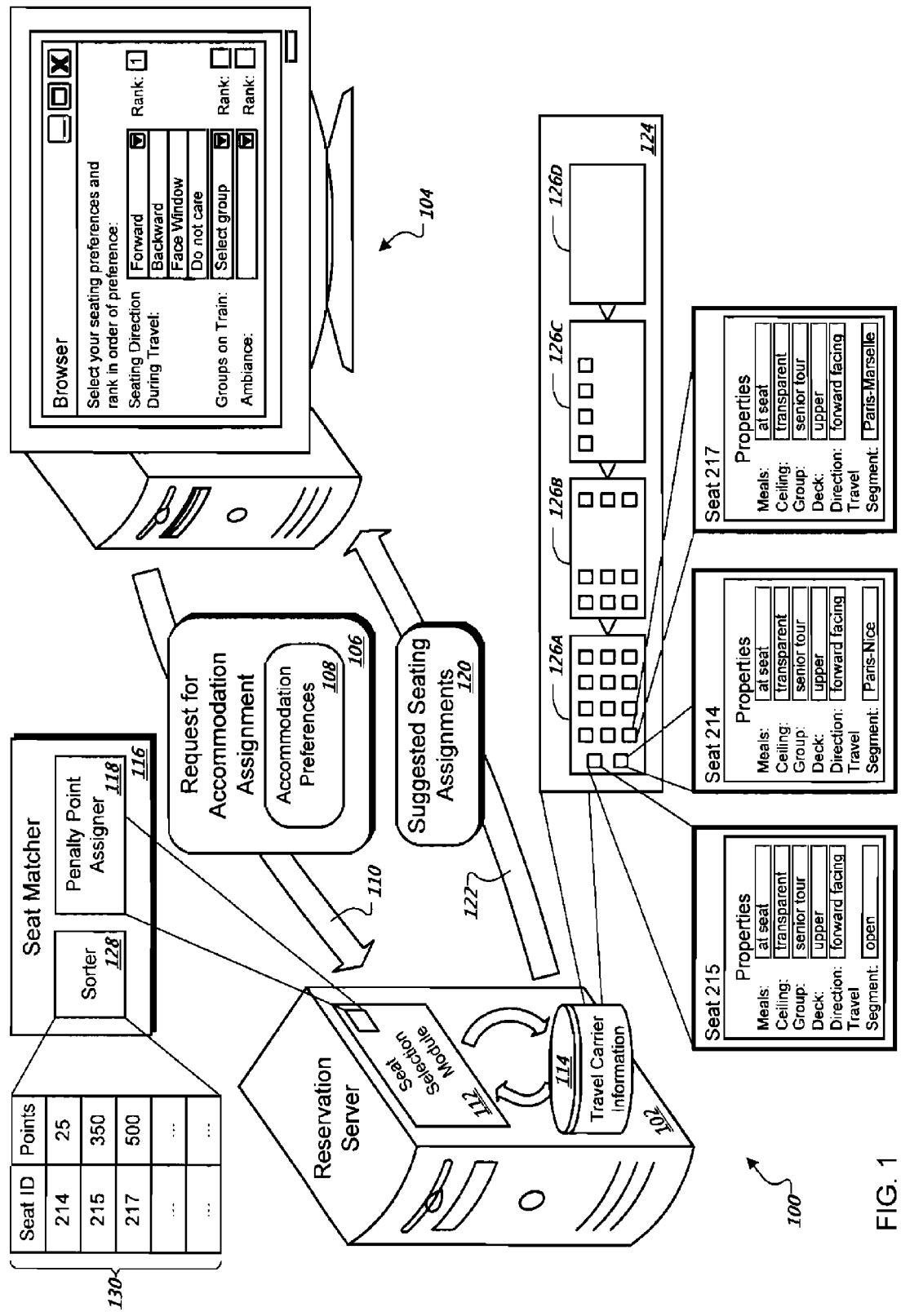
FIG. 1 is diagram of an exemplary system 100 for selecting an accommodation.

FIG. 1 is diagram of an exemplary system 100 for selecting an accommodation. The system 100 assigns points to seats on a train based on how well the seats' properties match or correspond to assignment criteria. The system 100 can sort the seats based on the amount of points assigned to each seat and can select one or more seats that best match the assignment criteria as indicated by a number of points assigned to the seats.

The implementation of system 100 shown in FIG. 1 includes a reservation server 102 that accepts requests 106 for accommodation assignments from a client 104. In some implementations, a potential passenger can access a web site interface for the reservation server 102. The passenger can enter or select criteria that specifies what preferences the passenger desires in an accommodation.

The client 104 can transmit the request 106 for an accommodation assignment 106 to the reservation server 102 as indicated by an arrow 110. The request 106 can includes accommodation preferences 108 that were selected by the potential passenger.

The reservation server 102 can select an accommodation that matches the accommodation preferences 108 selected by the potential passenger. In some implementations, the reservation server 102 includes a seat selection module 112 that selects the closest matching accommodation from travel carrier information 114, which includes properties associated with accommodations on travel conveyances.

The seat selection module 112 can include a seat matcher 116 that includes a penalty point assigner 118, which assigns points to accommodations based on a comparison between properties of the accommodations and the accommodation preferences 108 specified by the potential passenger. In some implementations, the penalty point assigner 118 assigns penalty points to an accommodation if the accommodation has one or more properties that do not correspond to the accommodation preferences 108.

The seat matcher 116 can also include a sorter 128 that orders seats based on points associated with the seats. The sorter 128 can select one (or more) of the seats which has properties that most closely match the specified accommodation preferences 108.

The reservation server 102 can transmit suggested seating assignments 120 to the client 104 as indicated by an arrow 122. The suggested seating assignments 120 can include accommodations selected by the sorter 128 as most closely satisfying the accommodation preferences 108.

For example, a passenger can use the client 104 to access a web page interface for the reservation server 102. The potential passenger can request a seat on a train traveling from Paris to Nice. The passenger also can specify that he or she would like to have a forward facing seating direction, sit with a particular group (e.g., a senior tour group), and sit in a seat within a section of the train that is reserved for particular activities (e.g., a section having a social ambience).

The reservation server 102 receives the request 106 for accommodation of assignment and accesses the traveler carrier information 114 to identify a seat having properties that correspond to the accommodation preferences 108 specified in the request 106.

A train traveling from Paris to Nice is represented by train 124 that has cars 126A-D. Within car 126A there are several seats including seat 214, seat 215, and seat 217. Each exemplary seat has several properties. The seat matcher 116 determines which of the seats in the train 124 has properties that substantially match the accommodation preferences 108 specified in the request for accommodation assignment 106.

More specifically, in some implementations, the penalty point assignor 118 of the seat matcher 116 assigns penalty points to accommodations based on how closely the accommodations properties match the accommodation preferences 1082. For example, if one of the seats has the property "no smoking" and the accommodation preferences 108 include a desired preference for smoking, the penalty point assigner 118 can assign penalty points to the seat because the seat's property "no smoking" does not correspond to the desired preference.

The penalty point assignor 118 can assign penalty points for accommodations in one or more of the cars of the train 124. The seat matcher 116 can also include a sorter 128 that orders the accommodations based on a number of penalty points assigned to each accommodation. For example, the seat 217 has 500 penalty points, the seat 215 has 350 penalty points, and the seat 214 has 25 penalty points as indicated by the sorted list of seats 130.

The sorter 128 can select seat 214 because it has the fewest amount of penalty points. The seat selection module 112 can generate the suggested seat assignment 120 that includes the selected seat 214. The reservation server can transmit the suggested seat assignment for seat 214 to the client 104. The client 144 can display the suggested seat assignment 120 within a web page that is viewed by the potential passenger. The potential passenger can accept or reject the suggested seat assignment. If the potential passenger accepts the suggested seat assignment, the client 104 can transmit the acceptance to the reservation system, which reserves the seat 214 for the passenger.

In some implementations, persons other than the potential passenger generate the request 106 for accommodation assignment. For example, an agent of the potential passenger such as a travel agent can submit the request 106.

Additionally, although the system 100 shows accommodations as including seats on a train, the accommodations can include other spaces on travel conveyances. For example, the accommodations can include cabins on a boat, seats on airplanes, train compartments, etc.

FIG. 2 shows two penalty point calculation tables 202, 204 and an exemplary penalty point calculations 206, 208 for accommodations. The table 202 has rows that list requested preferences and columns that list properties for available seats 212. In some implementations, the penalty point assigner calculates penalties by identifying the point value within a cell of the table 202 intersects the requested preference and the available property.

For example, if the requested preference is for an accommodation with a quiet ambiance and an available seat has a quiet ambiance property 214, zero penalty points are assigned to the accommodation because the preference and property exactly correspond. Instead, if the accommodation has a social ambiance property, 1000 penalty points are assigned because the social ambiance is not like the requested quiet ambiance. If the accommodation has a senior citizen property 218 (indicating a group of senior citizens are seating in a section that includes the accommodation), 600 penalty points are assigned to the accommodation because the senior citizen property 218 does not exactly correspond to the requested quiet ambience 213.

The penalty points assigned if the accommodation has a senior citizen property 218 may be less than the penalty points assigned if the accommodation has a social ambience 216 because the senior citizen property may be more like the request quiet ambience 213 than the social ambience property 216 (e.g., senior citizens may be more likely to be quiet than people in a section having a "social ambience").

If a potential passenger requests a social ambience preference 220, the penalty point assigner assigns 1000 points to a seat that has a quiet ambience property 214, assigns zero points to a seat that has a social ambience property, and assigns 800 points to a seat that has a senior citizen property. Similarly, the penalty point assigner can calculate penalty points when the requested preference is to sit with senior citizens 222.

The table 204 has rows 224 that list requested preferences "smoking" and "no smoking" and columns 226 that list "smoking" and "no smoking" properties associated with available seats 212. The penalty point assigner can calculate penalty points as described in reference to table 202.

As shown in FIG. 2, a request 228 for an accommodation assignment includes accommodation preferences "social ambience" and "smoking." Given the preferences specified in the request 228, the penalty point assigner can calculate penalty points for a seat having a "social ambience" property and a "smoking" property as follows. Using the table 202, the penalty point assigner determines that zero penalty points are assigned to a seat having a social ambience because the seat's property exactly matches the accommodation preference. Using the table 204, the penalty point assigner assigns 4000 penalty points to the seat having a no smoking property when a smoking preference is specified in the accommodation preference. In some implementations, the penalty point assigner sums the penalty points resulting from each seat property to determine a total number of penalty points to associate with the seat. In this example, the seat having the "social ambience" and "no smoking" properties has 4000 total penalty points (i.e., the sum of penalties is 0+4000=4000) as indicated in the penalty point calculation 206.

Again if the request 228 specifies accommodation preferences of "social ambience" and "smoking," the penalty point assigner determines the penalty point calculation 208 for a seat having a "senior citizen" property and a "smoking" property using the tables 202, 204. Using the table 202, the penalty point assigner can assign 800 penalty points to a seat having a "senior citizen" property when a "social ambience" preference is requested. Using the table 204, the penalty point assigner can assign zero penalty points to a seat having a "smoking" property when a "smoking" property is requested. For the accommodation preferences of the request 228, the penalty point assigner determines that the total number of penalty points is 800 for the seat having the "senior citizen" and the "smoking" property.

For this example, the seat matcher 116 can select the seat with the "senior citizen" and "smoking" properties as best matching the accommodation preferences. The seat matcher 116 can return the selected seat as part of the suggested seat assignments 120.

Figure 3:
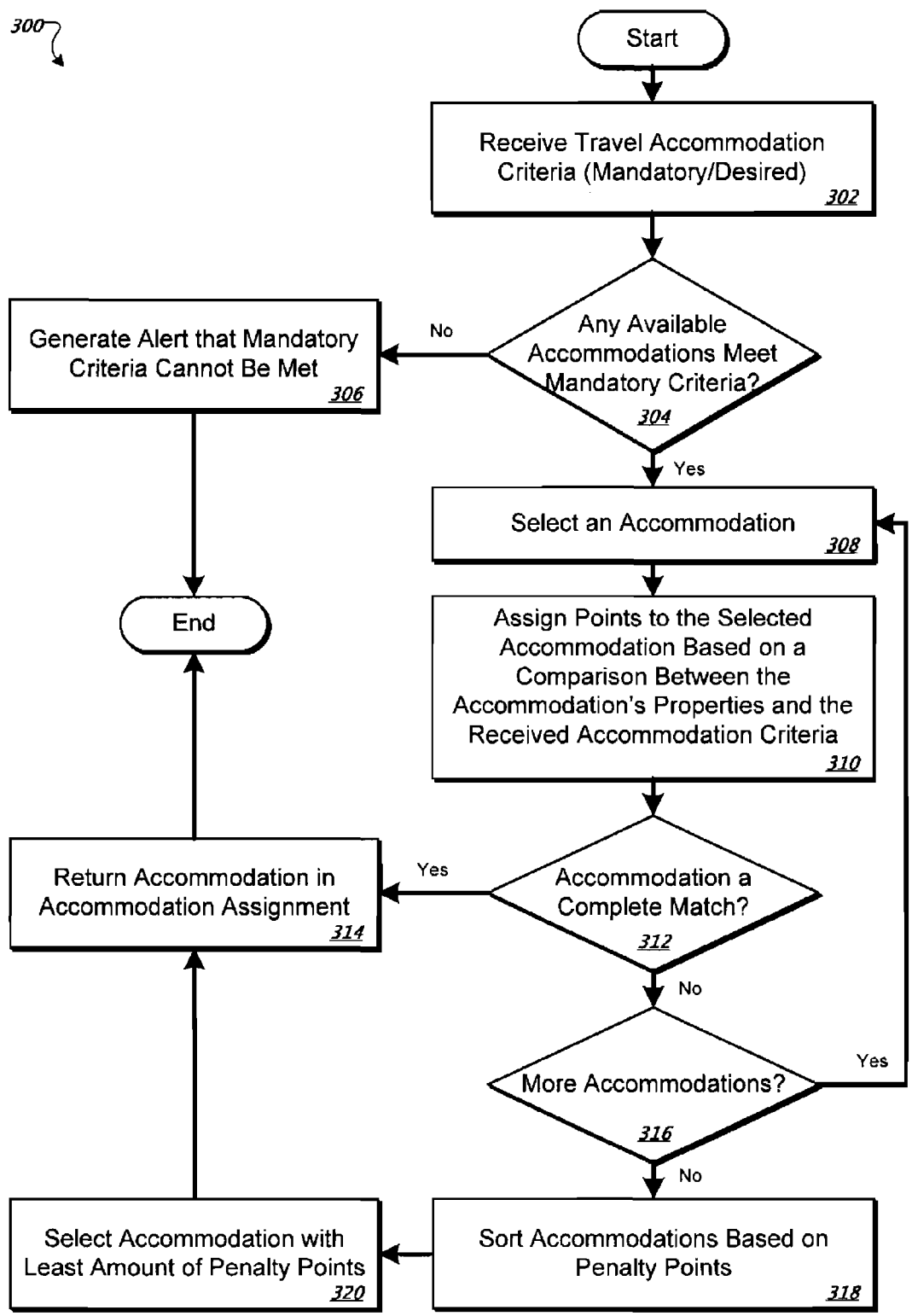
FIG. 3 is a flow chart showing an exemplary method 300 for selecting a seat.

FIG. 3 is a flow chart showing an exemplary method 300 for selecting a seat. The method 300 may be performed, for example, by a system such as the system 100 and, for clarity of presentation, the description that follows uses the system 100 as the basis of an example for describing the method 300. However, another system, or combination of systems, may be used to perform the method 300.

In step 302, travel accommodation criteria is received. The travel accommodation criteria can include mandatory and preferred, or desired, criteria. For example, a seat selection module 112 can receive accommodation preferences 108 which are specified by a potential passenger. In some implementations the accommodation preferences 108 include mandatory and desired criteria. For example, a potential passenger may specify he or she requires a handicapped accessible seat and prefers that the seat being located in the lower deck of a train.

In other implementations, the reservation server 102 can specify a portion of the travel criteria. For example, the reservation server can include maximum seat re-use rules that specify that the seat selection module 112 should—if possible—assign seats that were previously occupied on an earlier segment of a journey but that are now available. In some implementations, the maximum seat re-use rules may increase the number of passengers that may travel on a travel conveyance.

For example, a first person Albert may want to travel by train from Paris to Marseille, a second person Benjamin wishes to travel from Marseille to Nice, and a third person Claire wants to travel from Paris to Nice. Assuming there are two seats available on a train traveling from Paris to Marseille to Nice and assuming that a passenger cannot change seats during travel, the maximum seat re-use rules can specify that the seat selection module 112 should assign Albert and Benjamin to the same seat (during their respective segments of travel) and Claire to the remaining seat. Otherwise, one of the three people cannot reserve a seat because if Albert and Benjamin are assigned to different seats Claire will not be able to travel because she requires a seat for the entire journey from Paris to Nice.

As indicated in the implementation shown in FIG. 1, seat properties can include a travel segment property that specifies a leg of travel previously (or currently) assigned to a corresponding seat. The seat selection module can use this property with the maximum seat re-use rules to select a seat.

In step 304, a determination is made whether any available accommodations meet mandatory criteria. For example, mandatory criteria can include a class of travel associated with an accommodation such as first-class. If a first-class accommodation is not available, the method 300 can proceed to step 306.

In step 306, an alert can be generated that the mandatory criteria cannot be met. For example, the reservation system can transmit a message to the client 104 that alerts a potential passenger that the there is no accommodation that meets the specified requirements associated with the request for accommodation 106. After step 306, the method 300 can end.

If it is determined that one or more accommodations meet the mandatory criteria, step 308 can be performed. In step 308, an accommodation is selected. For example, the seat matcher 116 can select a seat that is available on the travel conveyance.

In step 310, points can be assigned to the selected accommodation based on a comparison between the selected accommodation's properties and the received accommodation criteria. For example, the penalty point assigner 118 can assign penalty points to the selected seat as described in reference to FIG. 2.

In step 312, it is determine whether the accommodation is a complete match based on the comparison between the accommodation's properties and the received accommodation criteria. For example, if the accommodation criteria included accommodation preferences for a seat that is on an upper deck and that is facing forward throughout travel and the selected seat has these properties, the penalty point assigner 118 can assign zero penalty points to the seat. In some implementations, the seat matcher or 116 can terminate the search for accommodations that match the accommodation preferences once a seat that exactly matches is identified (e.g., the penalty point assigner assigns zero points to a seat).

In step 314, the identified seat can be returned in an accommodation assignment. For example, the seat matcher 116 can pass the identified seat to the seat selection module 112, which in turn initiates a transmission of the suggested seat assignment 120 that includes the identified seat. After step 314, the method 300 can end.

If a complete match is not identified in step 312, the method can proceed to step 316. In step 316, it is determined whether there are more accommodations. For example, the seat matcher 116 can select a different seat. The penalty point assigner can assign penalty points to the different seat as previously described in association with steps 308, 310.

If there are no more accommodations to select, the method 300 can perform step 318. In step 318, accommodations are sorted based on penalty points. For example, the sorter 128 can sort the seats based on the amount of penalty points associated with each seat as illustrated in the sorted list 130.

In step 320, an accommodation with the least amount of penalty points is selected. For example, the sorter 128 selects a seat that is associated with the fewest number of penalty points. As previously described in association with step 314, the selected seat can be returned with the suggested seat assignment 120. After this, the method 300 can end.

Figure 4:
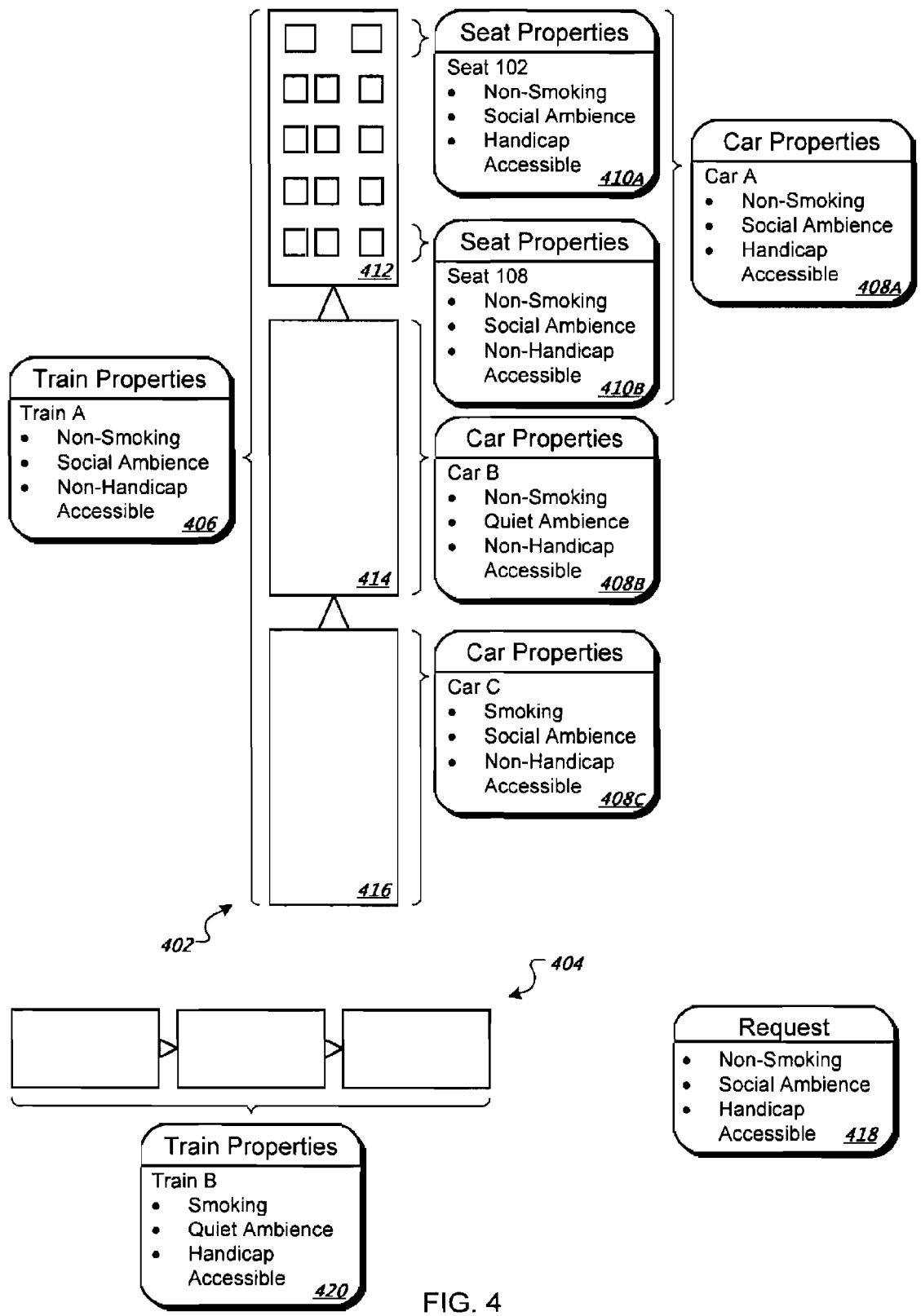
FIG. 4 shows a diagram representing logical groups of accommodations on a train.

FIG. 4 shows a diagram representing logical groups of accommodations on a train. In some implementations, grouping accommodations using one or more levels of abstraction may enable a reservation system to quickly identify an accommodation that meets passenger or system-specified accommodation criteria.

FIG. 4 includes representations of two trains 402, 404. The train A 402 has train properties 406, car properties 408A-C, and seat properties 410A, 410B. In some implementations, the seat properties 410A, 410B correspond to characteristics for individual seats on train A 402. For example, the seat properties 410A correspond to characteristics for seat 102. Specifically, seat properties 410A include a non-smoking property, a social ambience property, and a handicapped accessible property.

Similarly, seat properties 410B correspond to characteristics for seat 108 and include a non-smoking property, a social ambience property, and a non-handicapped accessible property.

In some implementations, the car properties 408A-C are based on seat properties of seats located within the respective cars. For example, car A 412 has car properties 408A that are based on the seats within the car A 412.

In some implementations, a car's properties are based on which properties are present in a majority of the seats. For example, car A's properties 408A include a non-smoking property, a social ambience property, and a handicap accessible property because a majority of the seats within car A 412 have these properties.

In another implementation, one or more of a car's properties are based on properties that are present in a minority of the seats within the car. For example, car A 412 may have two handicap accessible seats out of 14 seats; however the car properties 408A include a handicap accessible property. In some implementations, a reservation server can use car properties associated with a minority of seats within the car to highlight, for example, important, unusual, or mandatory properties that are associated with only a few seats on a travel conveyance. For example, only a few seats may be handicap accessible. Associating this property with cars that include those seats may enable a reservation server 102 to quickly locate those seats by searching car properties instead of searching individual seat properties.

In some implementations, train properties are based upon car properties for cars included in a train. For example, the train properties 406 for train A 402 are based on the car properties 408A-C. More specifically, the train properties 406 include a non-smoking property, a social ambience property, and a non-handicapped accessible property because a majority of the cars within the train A 402 include these properties. In other implementations, one or more of a train's properties are based on properties that are present only in a minority of the cars.

In some implementations, grouping accommodations using one or more levels of abstraction permits a reservation server to quickly locate a seat that matches accommodation criteria. For example, a reservation server (not shown) can receive a request 418 from a potential passenger for an accommodation on a train traveling from Paris to Nice. The request 418 specifies that the passenger desires an accommodation that has a non-smoking property, a social ambience property, and a handicap accessible property.

In this example, two trains—train A 402 and train B 404—travel from Paris to Nice on dates requested by the potential passenger. Instead of comparing properties of each seat on the two trains to the accommodation criteria specified in the request 418, the reservation server can use the levels of abstraction to locate a seat that matches the accommodation criteria specified in the request 418. Consequently, only a subset of the seats are analyzed.

In some implementations, the reservation server first compares the accommodation criteria to the train properties for train A 402 and train B 404. Train properties 406 for train A 402 include a non-smoking property, a social ambience property, and a non-handicap accessible property. Train properties 420 for train 404 B include a smoking property, a quiet ambience property, and a handicap accessible property. Two of the train properties 406 associated with the train A 402 (the non-smoking and social ambience properties) match the accommodation criteria, whereas only one (the handicap accessible property) of the train properties 420 of the train B 404 match the accommodation criteria of the request 418.

Assuming the handicap accessible criteria is not mandatory, the reservation system can select the train A 402 as a better match for the request 418 because train A has more properties that correspond to the accommodation criteria specified in the request 418. If the handicap accessible criteria is mandatory or is weighted in a way that overwhelmingly favors this property, the reservation system can select the train B 404 as a better match for the request 418 because the train B 404 is the only train that has a handicap accessible property.

If the train A 402 is selected, the reservation server can analyze properties for each of train A's cars to determine which car has properties that most closely correspond to the accommodation criteria specified within the request 418. In the example of FIG. 4, the car A 412 has car properties 408A that include a non-smoking property, a social ambience property, and a handicap accessible property. The car B 414 has car properties 408B that include a non-smoking property, a quiet ambience property, and a non-handicap accessible property. The car C 416 has car properties 408C that include a smoking property, a social ambience property, and a non-handicap accessible property. The reservation server can select car A 412 from among the other cars because the car A 412 has properties that exactly correspond to the accommodation criteria of the request 418.

In some implementations, once the car A 412 is identified, the reservation server can analyze seat properties for each of the seats within the car A 412 to identify a seat that is available and corresponds to the requested accommodation criteria. For example, the reservation server can select the seat 102 because the seat 102 has seat properties 410A that exactly correspond to the accommodation criteria specified in the request 418.

Figure 5:
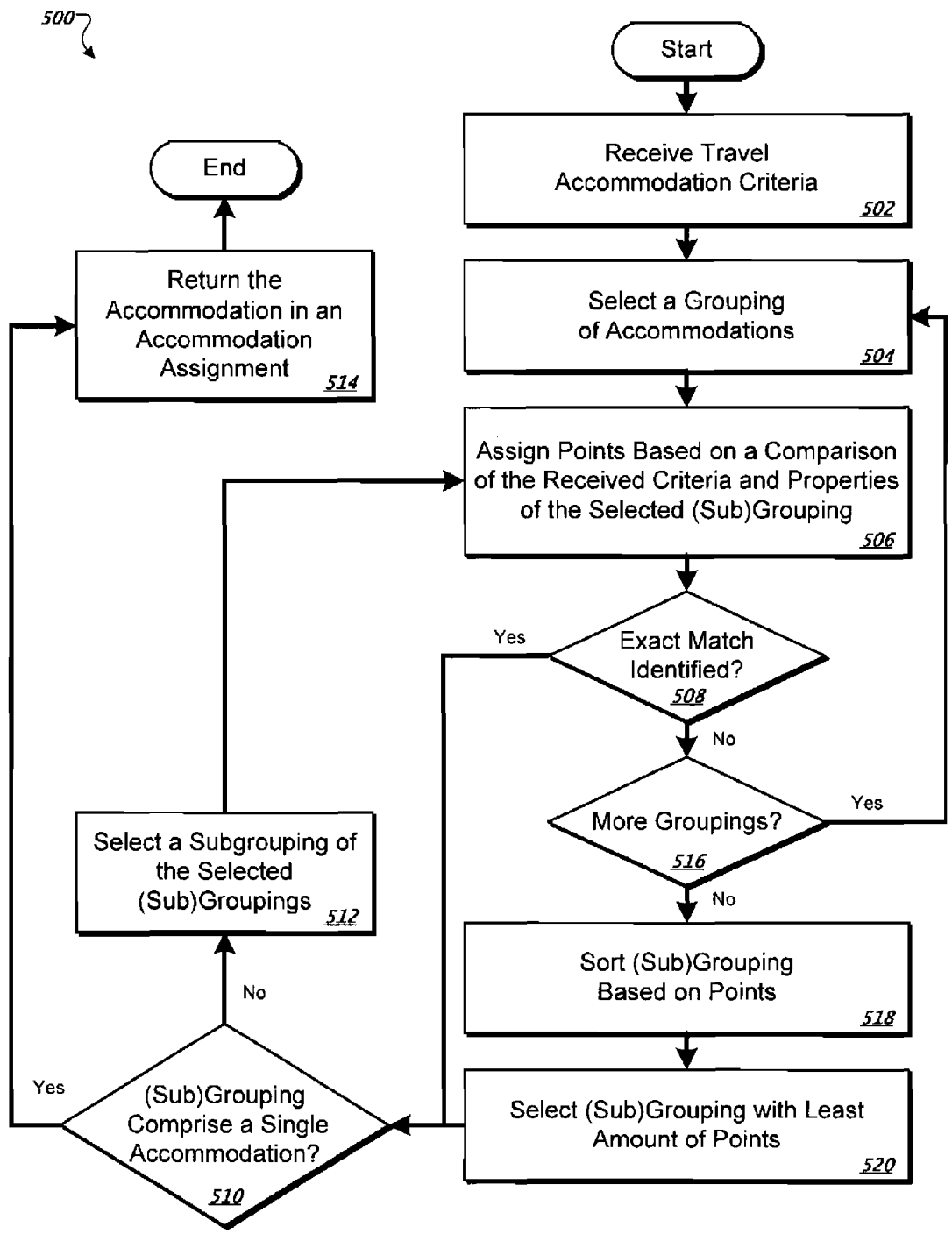
FIG. 5 is a flow chart of an exemplary method 500 for selecting an accommodation based on properties of grouped accommodations.

FIG. 5 is a flow chart of an exemplary method 500 for selecting an accommodation based on properties of grouped accommodations. For purposes of explanation, the system 100 of FIG. 1 and the accommodation groups of FIG. 4 are used as examples to explain the method 500; however, other systems or accommodation groups can be used in association with the method 500.

In step 502, travel accommodation criteria is received. For example, the reservation server 108 can receive the request 106 for an accommodation assignment that includes accommodation preferences 108.

In step 504, a grouping of accommodations is selected. For example, the reservation server 102 can select one or more trains such as the trains A and B. The trains A and B are aggregated groups of cars that, in turn, are aggregated groups of seats.

In step 506, points are assigned based on a comparison of the received accommodation criteria and properties of the selected (sub)grouping. In some implementations, the reservation server 102 analyzes properties of the largest grouping of accommodations in a first iteration. For example, the penalty point assignor 118 can assign penalty points to the train properties 406 of the train A 402 based on a comparison of the train properties 406 with the accommodation preferences 108.

In subsequent iterations, the reservation server 102 can analyze properties of a subgroup of the previously analyzed group. For example, in a second iteration, the reservation server 102 can select the car A 412 within the train A 402. The penalty point assignor 118 can assign penalty points based on a comparison of the car properties 408 with the accommodation preferences 108.

In step 508, a determination is made whether an exact match between the received accommodation criteria and the properties of the selected (sub)grouping is identified.

If an exact match is identified, the method 500 proceeds to the step 510. For example, if the accommodation preferences 108 specified that an accommodation should have a no smoking property, a social ambience property, and a non-handicap accessible property, the reservation server determines that the train A 402 is an exact match because the train properties 406 exactly correspond to the accommodation preferences.

In step 510, a determination is made whether the (sub) grouping comprises a single accommodation. If the (sub) grouping does not comprise a single accommodation the method 500 can proceed to step 512. For example, the reservation server 102 can determine that the train A 402 comprises subgroupings that include cars. In step 512, a subgrouping of the previously selected (sub)grouping is selected.

For example, if the previously selected grouping is train A, the reservation selects one of the cars of train A. The method 500 would then compare the properties of the cars for the train A 402 to the received criteria as previously discussed in association with step 506.

If the subgrouping comprises a single accommodation as determined in step 510, the method 500 performs step 514. In step 514, the single accommodation is returned in an accommodation assignment. For example, if the method 500 has iterated so that the selected grouping of accommodations in step 504 is a single accommodation within a previously selected car of a previously selected train, the method 500 proceeds to step 514. In step 514, the reservation server 102 returns the accommodation as part of the suggested seat assignments 120. After step 514, the method 500 can end.

Referring again to step 508, if an exact match is not identified, the method 500 proceeds to step 516. For example, the penalty point assignor 118 can assign penalty points to a train if the train's properties do not exactly correspond to the received travel accommodation criteria.

In step 516, it is determined whether there are more (sub) groupings at the same abstraction level. For example, the reservation server 102 can determine whether there are additional trains that have not been assign penalty points. If there are additional (sub)groupings, the method 500 can repeat steps starting with the step 504. If there are no additional (sub)groupings, the method 500 performs step 518.

In step 518, the (sub)groups are sorted based on assigned points. For example, trains can be sorted in ascending order based on the number of penalty points assigned to each train.

In step 520, a (sub)grouping associated with the least amount of penalty points is selected. For example, train A 402 is selected instead of train B 404 because less penalty points are assigned to train A relative to train B. After step 520, the method performs step 510 as previously described.

Figure 6:
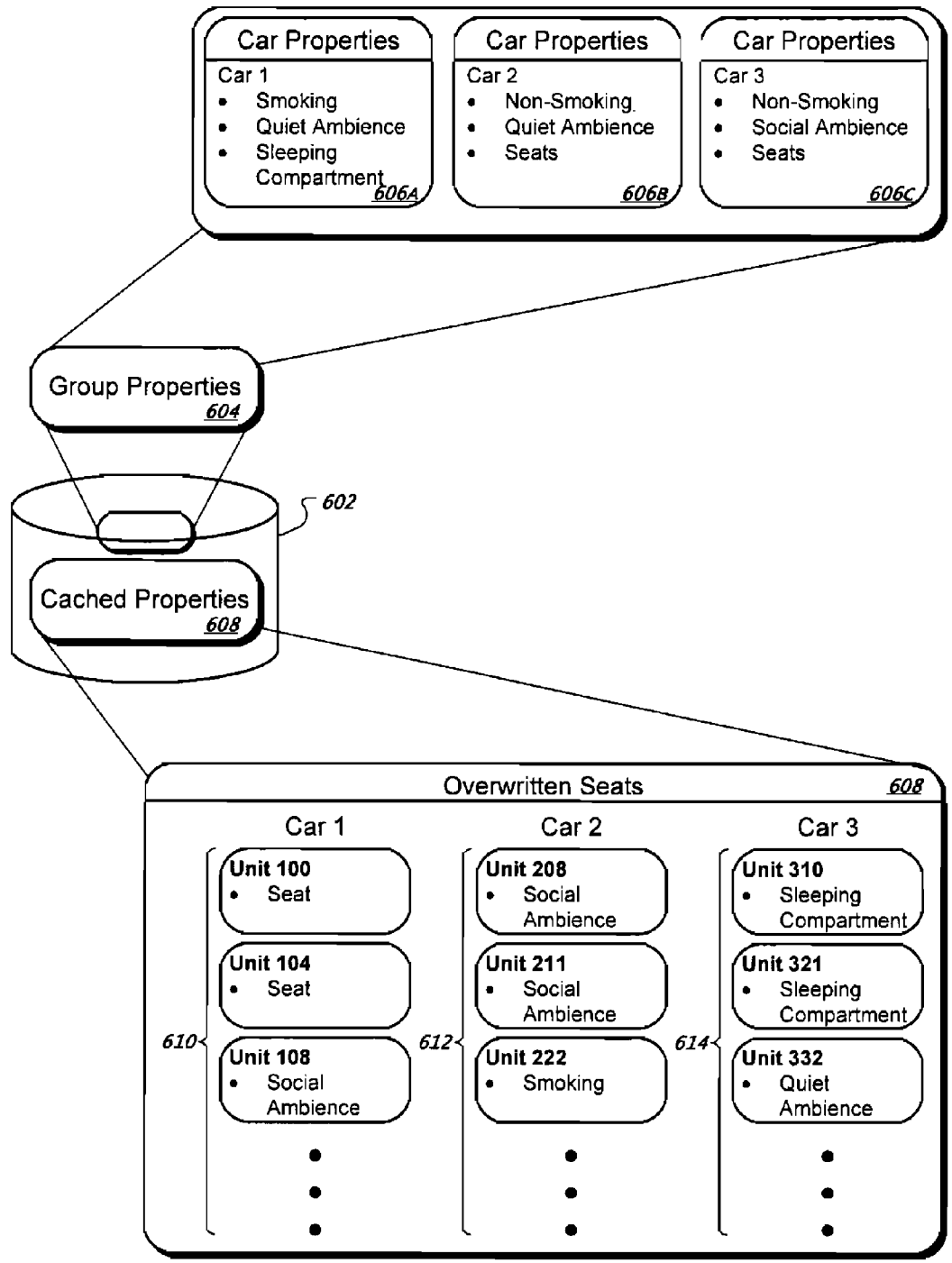
FIG. 6 shows a diagram of a cache that includes exemplary information about what properties of a first grouping are different from a second grouping at a higher abstraction level.

FIG. 6 shows a diagram of a cache that includes exemplary information about what properties of a first grouping are different from a second grouping at a higher abstraction level.

A data store 602 accessible to a reservation server can include group properties 604 such as train car properties 606A-C. The data store 602 can also include information 608 about properties that are overwritten. For example, the car properties 606A of car 1 include a smoking property, a quiet ambience property, and a sleeping compartment property (which indicates that car 1 includes sleeping compartments).

However, not every accommodation within car 1 may have car properties 606A. For example, overwritten information 610 for car 1 specifies that accommodations identified as units 100 and 104 have a seat property instead of a sleeping compartment property indicating that the units are seats on the car 1. The overwritten information 610 also specifies that a unit 108 has a social ambience property instead of a quiet ambience property.

Similarly, the information 608 about overwritten properties includes information 612, 614 about overwritten accommodation properties for cars 2 and 3.

In some implementations, the reservation server 102 can use the cached information in the data store 602 to identify accommodations that satisfy accommodation criteria specified in a request for an accommodation assignment. For example, instead of storing properties for each accommodation, the reservation server 102 may only store information for an accommodation that has properties that are different, or overwritten, relative to a grouping that includes the accommodation. In some implementations, this may reduce the amount of information that must be stored and consequently analyzed during a seat selection process.

In one implementation, the reservation server 102 can compare received accommodation criteria to car properties 606A-C. If a received accommodation criterion is mandatory and none of the car properties 606A-C have a corresponding property, the reservation server 102 can access the overwritten information 608 to determine whether any of the underlying units satisfy the mandatory criterion.

In some implementations, the reservation server 102 can select a car that most closely matches the accommodation criteria (with the exception that the selected car lacks the mandatory criterion). The reservation system 102 can search the available accommodations within the selected car to determine whether any of the accommodations have a property that corresponds to the mandatory criterion.

In another implementation, one or more of the abstracted groupings of accommodations have a specified mandatory criterion (or there is no mandatory criterion). The reservation system can select an abstracted grouping that best matches the received accommodation criteria. The reservation system can then search properties associated with accommodations within the abstracted grouping to identify an accommodation that has properties which correspond to the received accommodation criteria.

For example, the accommodation criteria can specify a potential passenger has a no smoking preference, a social ambience preference, and a sleeping compartment preference. The reservation server 102 can select car 3 that has car properties 606C because car 3 has properties that most closely match the specified accommodation criteria. The reservation server hundred 102 can search units within car 3 to identify a unit that has properties that most closely correspond to the accommodation criteria.

For example, because the reservation server 102 has already determined that the car 3 has a no smoking property and a social ambience property, the reservation server 102 may only analyze seats that have overwritten data associated with the seat property. In this example, the units 310, and 321 have a sleeping compartment property instead of a seat property. The unit 332 has an overwritten property indicating that it has a quiet ambience instead of a social ambience.

In some implementations, the reservation server 102 does not analyze unit 332 because unit 332 does not have an overwritten property associated with the sleeping property. Instead, the reservation system selects units 310 and 321 to analyze because they have overwritten information that is different form the seat property associated with the car property 606C. In some implementations, if the reservation server 102 selects the unit 310 to analyze, the reservation server 102 can return the unit 310 as a appropriate accommodation without analyzing the remaining unit 321.

Although the example of FIG. 6 shows overwritten properties for accommodations, the data store 602 can also include information about overwritten properties for abstracted groupings. For example, the data store 602 can include information that specifies car properties that are different, or over written, relative to train properties for a train that includes the cars.

Figure 7:
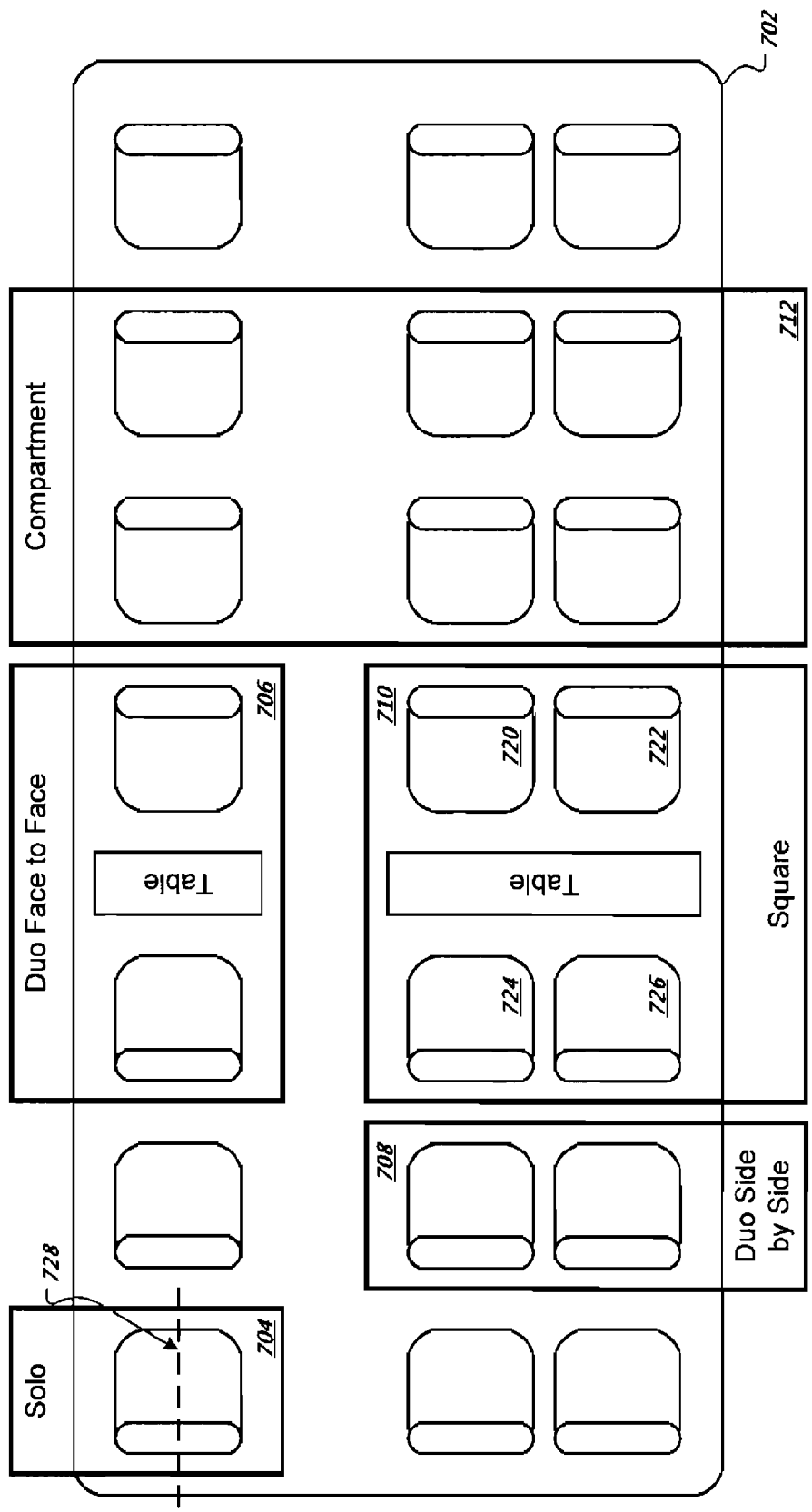
FIG. 7 is a diagram of an exemplary pre-grouping of accommodations used to select an accommodation Like reference symbols in the various drawings indicate like elements.

FIG. 7 is a diagram of an exemplary pre-grouping of accommodations used to select an accommodation. Car 702 illustrates exemplary groupings of seats that include a solo grouping 704, a duo face-to-face grouping 706, a duo side-by-side grouping 708, a square grouping 710, and a compartment grouping 712.

For the example of FIG. 7, the solo grouping 704 is defined to include an individual seat without other seats located opposite or to the side of the individual seat. The duo seat groupings 706, 708 can include two seats that are side-by-side or facing each other. The square grouping 710 includes two pairs of seats that face each other. The compartment grouping 712 can include, for example, six seats comprising two groups—one group of two seats and a second group of four seats—where the two groups are separated by an aisle.

In some implementations, a potential passenger can specify that he or she will be traveling with other passengers. The reservation server 102 can use the groupings to attempt to assign the passengers so that they are seated together. More specifically, the reservation server 102 can select a available grouping that can accommodate all of the passengers and that leaves a minimum of free seats (i.e., number of seats in the group=number of passengers+x, where x is minimized).

In certain situations, the reservation server cannot place the passengers in a single grouping. In some implementations, the reservation server may split the group of passengers into smaller groups. When breaking the group of passengers into smaller groups, the reservation server may keep at least two passengers in the smallest subgroup as a priority.

As discussed subsequently with reference again to FIG. 7, the described systems and methods can also generate new properties based on other properties assigned to an accommodation grouping (including individual accommodations). For example, a seat, car, or a train may have one or more properties that are used to derivative values for additional properties.

The derived properties can be specified during runtime of an application running on a reservation server. For example, a user can specify a new social ambience property to associate with seats. The application running on the reservation server 102 can assign the social ambience property to seats that are associated with other properties such as a smoking property and a property that indicates that the seats are located within a dining car. The social ambience property can be generated for use by the application without recompiling the application.

Additionally, the derived property can be dynamically assigned based on other properties assigned to accommodations, where the other properties may change during execution of the application. For example, a particular train seat may be associated with a smoking property during one journey, but may be associated with a non-smoking property during a different journey. The application running on the reservation server 102 can remove the social ambience property from the seat when the seat no longer has the smoking property. For ease of reference, the properties from which a new property is based upon will be referred to as "base" properties. The new property derived from the base properties will be referred to as a "derivative" property.

For further illustration, an example of base and derivative properties is given in association with FIG. 7. Referring to FIG. 7, a potential passenger may specify that he or she prefers to reserve a train seat that travels in a forward facing direction during travel. Many factors may influence whether a seat is forward facing during travel such as a direction that a car containing the seat is facing, a direction from which a train including the car starts, and whether the train changes direction during the journey. A seat can be assigned or associated with properties that correspond to each of these factors. For example, a seat can be associated with a car grouping, which has properties that indicate a first end of the car is facing towards a first end of the train. The seat can also be associated with a train grouping that indicates that the first end of the train is moving forward. The train grouping can be associated with a property that indicates that the train will stop at the head station at which time the train (or the car) will switch directions. Additionally, the seat can be associated with an angle that indicates that the seat is parallel with the sides of the car (e.g., has an axis running laterally through a center of the seat is at a 0° offset relative to a line substantially parallel with sides of the car). These properties may be the base properties of the seat.

In some implementations, the reservation server 102 can generate or assign derived properties from the base properties. For example, the seat having the base properties previously described may be assigned a forward facing derivative property because the seat is initially facing toward a first end of the car, which in turn is facing towards a first end of the train that is traveling forward. The derivative property can be dynamically updated to indicate that the seat is facing backward after the train arrives at a head station because the train switches directions at this time.

In another example, if a direction is changed at a head station, a seat that was previously assigned a backward facing property can be dynamically assigned a forward facing property if the seat has certain base properties such as having an angle property of 0°, which indicates that the seat's position is symmetrical within the car. For example, the axis 728 of the seat within the solo grouping 704 indicates that the seat has an angle property of 0°. In this implementation, angle property of 0° indicates that if the seat is facing exactly backwards and the direction of travel is changed, the seat will face exactly forwards.

In another example, the seat can be dynamically assigned a group property that indicates that the seat belongs to a particular group. For example, the reservation server 102 can assign the seats 720, 722, 724, and 726 to a first group. The reservation server 102 can determine that the seats should be assigned a property that indicates they are part of a square grouping because there are four seats, the seats are two to an aisle, and the aisles face each other. As previously described in association with FIG. 7, if a potential passenger requests a seating accommodation for four people, the reservation server 102 can search for available square groupings.

In some implementations, if one of the seats in a grouping is reserved, the group property can be automatically updated to reflect the reservation. For example, if a single seat in a square grouping is reserved, the reservation server 102 can modify group properties of the remaining three seats to reflect that the seats are now part of a "trio" grouping.

In some implementations, dynamic regrouping may permit more efficient allocation of seats. For example, if a square grouping property was statically assigned and one of the seats in the square grouping was reserved, it would leave three seats available for reservation. However, if a potential passenger searched for three available seats (e.g., a trio grouping), the reservation server 102 may not search the square grouping (or may not include it in an initial search) because the group property indicates that the grouping is for four seats. By dynamically updating the grouping property, the reservation server 102 can group the three unreserved seats into a trio grouping. When a potential passenger requests seats for three passengers, the trio grouping may be included in the initial search for accommodations.

Figure 8:
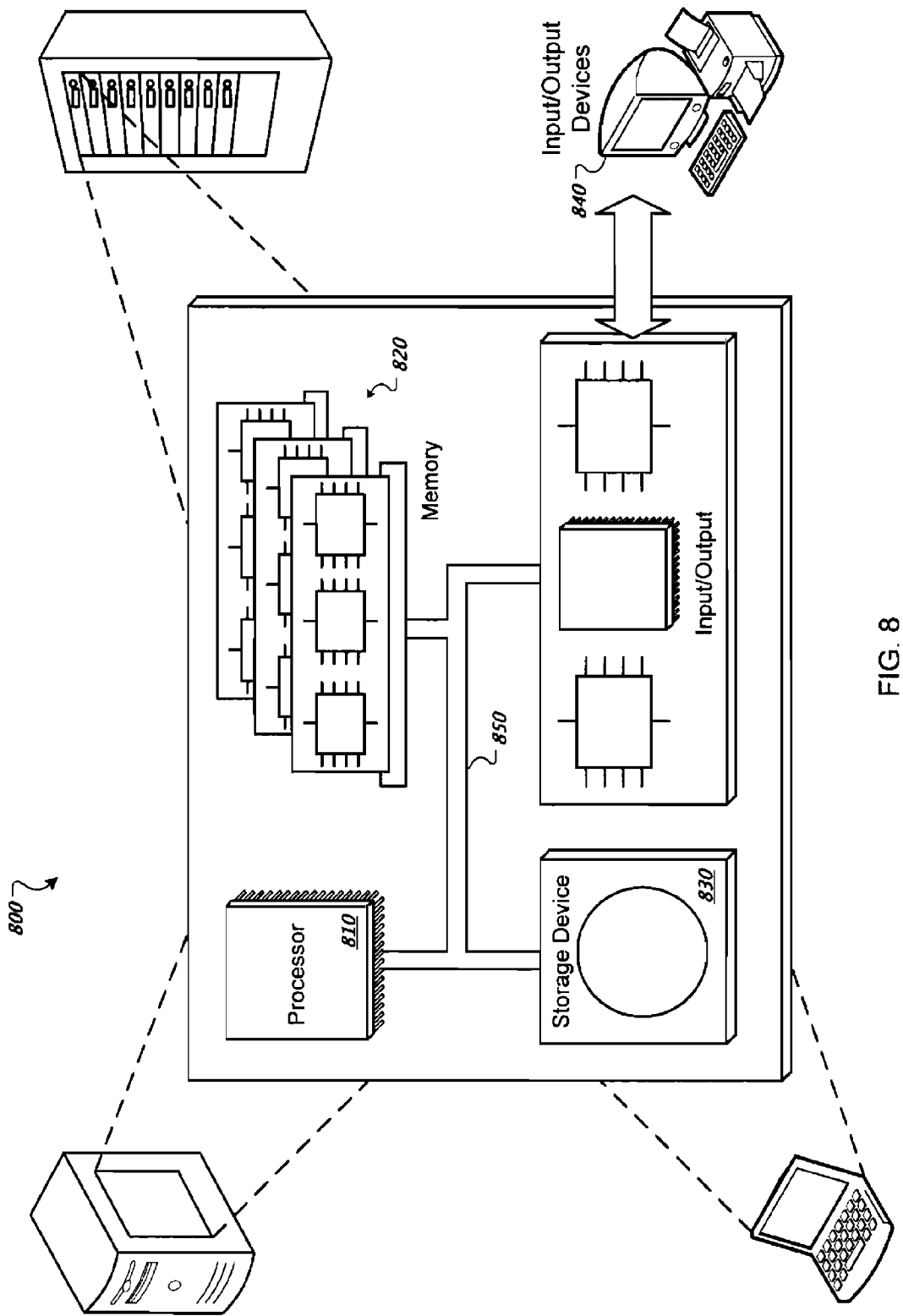
FIG. 8 is a schematic diagram of a computer system.

FIG. 8 is a schematic diagram of a computer system 800. The system 800 can be used for the operations described in association with any of the computer-implement methods described previously, according to one implementation. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, although the points assigned to the accommodations in FIG. 1 are shown as penalty points that mitigate against selection of an accommodation, other weighting implementations can be used. For example, the reservation server can assign favored points to an accommodation if the accommodation has properties that correspond to accommodation preferences. The more favored points associated with an accommodation, the more likely the reservation system will select the accommodation for a suggested seat assignment.

Also referring to FIG. 6, in some implementations, the cached property information is stored in addition to property information that is stored elsewhere. For example, the data store 602 that stores the overwritten property information 608 may be implemented using quick access memory. Another data store having a slower access time such as a hard disk also may store property information. In some implementations, the property information stored on a slower access device may include all (or more) of the properties for the accommodations and not just the overwritten properties.

In other implementations, penalty points, or weights, are assigned to an accommodation based on whether passengers assigned to surrounding accommodations arrive or depart at the same time. For example, weights are assigned to seats so that an occurrence of passengers exiting or entering together is optimized. For instance, if a potential passenger is scheduled to exit at Marseille, France, the penalty point assigner can assign fewer penalty points to accommodations located near other accommodations having passengers exiting at Marseille.

In yet other implementations, penalty points, or weights are assigned to an accommodation based on whether a section or car of the travel conveyance is occupied. For instance, the points can be assigned so that passengers are first assigned to the least occupied car (if accommodations within the car meet the accommodation criteria). For example, the penalty point assigner can assign fewer penalty points to accommodations within cars that are assigned fewer passengers.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

For example, instead of examining all the properties of one seat at a time to determine if the seat's properties correspond to the accommodation preferences, a system implementing the method 300 of FIG. 3 can examine a single property for each of the available seats before examining the next property for the available seats. Accordingly, other implementations are within the scope of the following claims.

What is claimed is:

1. A computer-implemented process comprising:
receiving digital accommodation criteria for an accommodation assignment requested for a passenger;
electronically accessing accommodation properties that specify characteristics of accommodations offered on a travel conveyance, wherein a first portion of the accommodation properties are base properties and a second portion of the accommodation properties are derivation properties derived from the base properties during execution of a software program configured to access the accommodation properties;
assigning, by one or more processors, weights to the accommodation properties based on a comparison between the accommodation properties and the received accommodation criteria;
determining, by one or more processors, total weighting scores for each of one or more of the accommodations based on an aggregation of the assigned weights for the accommodation properties associated with the accommodation; and
digitally outputting, for the passenger, the requested accommodation assignment comprising a selected accommodation identified based on the selected accommodation's total weighting score.

2. The process of claim 1, further comprising ending the determination of total weighting scores if a particular accommodation has a total weighting score that indicates that the particular accommodation's associated accommodation properties exactly match the received accommodation criteria.

3. The process of claim 2, further comprising selecting the particular accommodation for output in the accommodation assignment.

4. The process of claim 1, further comprising sorting the one or more accommodations based on the total weighting scores.

5. The process of claim 4, further comprising selecting, for output in the accommodation assignment, a particular accommodation based on the particular accommodation's position within the sorted one or more accommodations.

6. The process of claim 1, wherein the assignment of weights is completed for substantially all of the accommodation properties for an individual accommodation before assigning weights to accommodation properties for a next individual accommodation.

7. The process of claim 1, further comprising aggregating accommodations into groups having group properties that correspond to at least some of the accommodation properties of the aggregated accommodations within a group.

8. The process of claim 7, further comprising assigning weights to the group properties based on a comparison between the group properties and the received accommodation properties.

9. The process of claim 8, further comprising determining total weighting scores for each of one or more of the groups based on an aggregation of the assigned weights for the group properties associated with the group.

10. The process of claim 9, further comprising selecting a particular group from the one or more groups based on the particular group's total weighting score.

11. The process of claim 10, wherein the selected accommodation that is output in the accommodation assignment is selected from within the particular group.

12. The process of claim 7, further comprising caching information indicative of whether a group property overwrites an individual accommodation's property.

13. The process of claim 1, further comprising grouping accommodations that are located physically together.

14. The process of claim 13, further comprising receiving a request for multiple accommodation assignments for multiple passengers traveling together and selecting one of the grouped accommodations so that each of the multiple passengers is associated with an accommodation while minimizing a number of accommodations within the selected group that are not assigned to one of the multiple passengers.

15. The process of claim 1, further comprising assigning weights that contribute to a total weighting score based on whether an accommodation that was previously occupied on a first segment of a journey can be reassigned on a second segment of the journey.

16. The process of claim 1, further comprising assigning weights that contribute to an accommodation's total weighting score based on whether passengers assigned to surrounding accommodations are scheduled to arrive or depart at substantially the same time.

17. The process of claim 1, further comprising assigning weights that contribute to an accommodation's total weighting score based whether a section or car of the travel conveyance is occupied.

18. The process of claim 1, wherein a portion of the digital accommodation criteria is specified by the passenger.

19. A computer-implemented process comprising:
aggregating individual accommodations offered on a travel conveyance into accommodation groups;
assigning, by one or more processors, to each accommodation group, a plurality of group properties that specify characteristics of some of the individual accommodations included in the accommodation group;
digitally receiving accommodation criteria for an accommodation assignment requested for a passenger;
assigning, by one or more processors, weights to the group properties based on a comparison between the group properties and the received accommodation properties;
identifying a particular accommodation group having group properties that correspond to at least a portion of the received criteria based, at least in part, on the assigned weights;
comparing the received criteria to properties of individual accommodations within the particular accommodation group; and
outputting, based on the comparison, the requested accommodation assignment comprising an individual accommodation selected from the particular accommodation group.

20. A system comprising:
a data store storing accommodation properties that specify characteristics of accommodations offered on a travel conveyance, wherein a first portion of the accommodation properties are base properties and a second portion of the accommodation properties are derivation properties derived from the base properties during execution of a software program configured to access the accommodation properties;
a weight assigning module to assign weights to the accommodations based on a comparison between the accommodation properties and accommodation criteria received as part of an accommodation assignment request for a passenger;
a sorting module to order the accommodations based on the accommodations' assigned weights; and
an interface to output the requested accommodation assignment comprising a particular accommodation selected based on a position of the particular accommodation within the ordered accommodations.

* * * * *